United States Patent [19]

Schmidt et al.

[11] Patent Number: 5,332,121

[45] Date of Patent: * Jul. 26, 1994

[54] SQUEEZABLE MULTI-LAYER DISPENSING CONTAINER WITH ONE-WAY VALVE

[75] Inventors: Steven L. Schmidt; Wayne N. Collette, both of Merrimack; Suppayan M. Krishnakumar, Nashua, all of N.H.

[73] Assignee: Continental PET Technologies, Inc., Florence, Ky.

[*] Notice: The portion of the term of this patent subsequent to Apr. 12, 2011 has been disclaimed.

[21] Appl. No.: 994,681

[22] Filed: Dec. 22, 1992

Related U.S. Application Data

[63] Continuation-in-part of Ser. No. 814,923, Jan. 8, 1992, Pat. No. 5,301,838, which is a continuation-in-part of Ser. No. 644,624, Jan. 23, 1991, abandoned, and Ser. No. 698,931, May 13, 1991, abandoned.

[51] Int. Cl.⁵ .............................................. B65D 35/14
[52] U.S. Cl. .................................... 222/95; 222/105; 222/386.5; 222/389; 222/107
[58] Field of Search ............... 222/95, 105, 107, 386.5, 222/389, 209

[56] References Cited

U.S. PATENT DOCUMENTS

| | | |
|---|---|---|
| 798,093 | 8/1905 | Dean . |
| 1,632,559 | 6/1927 | Pedrick . |
| 2,571,424 | 10/1951 | Dailey . |
| 2,924,359 | 2/1960 | Beremand . |
| 3,097,766 | 7/1963 | Biehl et al. . |
| 3,462,046 | 8/1969 | Bartels .................... 222/95 X |
| 3,549,050 | 12/1970 | Bruce et al. ..................... 222/95 |
| 3,581,941 | 6/1971 | Bruce et al. ..................... 222/95 |
| 3,752,351 | 8/1973 | Nagata . |
| 3,836,335 | 9/1974 | Eppes . |
| 3,862,708 | 1/1975 | Waylax .................... 222/386.5 X |
| 4,034,896 | 7/1977 | Wilson . |
| 4,147,278 | 4/1979 | Uhlig . |
| 4,182,457 | 1/1980 | Yamada et al. . |
| 4,254,075 | 3/1981 | Menzel et al. . |
| 4,418,841 | 12/1983 | Eckstein . |
| 4,457,455 | 7/1984 | Meshberg . |
| 4,469,250 | 9/1984 | Everzich .................... 222/95 X |
| 4,484,697 | 11/1984 | Fry . |
| 4,526,823 | 7/1985 | Farell et al. . |

(List continued on next page.)

FOREIGN PATENT DOCUMENTS

| | | |
|---|---|---|
| 68009 | 10/1940 | Czechoslovakia . |
| 0182094 | 5/1986 | Fed. Rep. of Germany . |
| 3133748 | 6/1991 | Japan . |
| 9200094 | 10/1992 | PCT Int'l Appl. . |
| 1455453 | 11/1976 | United Kingdom . |
| WO92/11187 | 7/1992 | World Int. Prop. O. . |

Primary Examiner—Robert P. Olszewski
Assistant Examiner—Dean A. Reichard
Attorney, Agent, or Firm—Wolf, Greenfield & Sacks

[57] ABSTRACT

A squeezable container for dispensing a product out the open end of the container, including a collapsible inner layer and a resilient outer layer. The container is an integral body formed by expansion from a multi-layer preform, and preferably consists of one or more layers of polyethylene terephthalate (PET) separated by an adjacent boundary layer, such as a barrier layer of ethylene vinyl alcohol (EVOH). A one-way check valve is provided at the outer layer to restrict the flow of air into a chamber which is formed between the inner and outer layers as the inner layer collapses, and preferably a second check valve is provided in the open dispensing end of the container to prevent air from being drawn into the container when the outer layer is released. The container is economical to manufacture, light in weight, easy to handle, can be made of recycled materials, and is "product efficient" in that substantially all of the product can be dispensed from the container during use.

28 Claims, 3 Drawing Sheets

U.S. PATENT DOCUMENTS

| | | |
|---|---|---|
| 4,609,516 | 9/1986 | Krishnakumar et al. . |
| 4,693,395 | 9/1987 | Tavss et al. . |
| 4,693,396 | 9/1987 | Tavss et al. . |
| 4,741,936 | 5/1988 | Nohara et al. . |
| 4,760,937 | 8/1988 | Everzich ............................ 222/95 |
| 4,781,954 | 11/1988 | Krishnakumar et al. . |
| 4,875,508 | 10/1989 | Burke, II et al. . |
| 4,892,230 | 1/1990 | Lynn, Jr. . |
| 4,921,135 | 5/1990 | Pleet . |
| 4,951,841 | 8/1990 | Tavss et al. . |
| 4,954,376 | 9/1990 | Krishnakumar et al. . |
| 4,980,100 | 12/1990 | Krishnakumar et al. . |
| 4,984,713 | 1/1991 | Chambers et al. . |
| 5,012,956 | 5/1991 | Stoody . |
| 5,020,691 | 6/1991 | Nye . |
| 5,035,931 | 7/1991 | Yamada et al. . |
| 5,078,948 | 1/1992 | Troutman et al. . |
| 5,137,179 | 8/1992 | Stoffel . |
| 5,242,085 | 9/1993 | Richter et al. ...................... 222/105 |
| 5,242,086 | 9/1993 | Richter et al. ...................... 222/105 |

SQUEEZABLE MULTI-LAYER DISPENSING CONTAINER WITH ONE-WAY VALVE

This is a continuation-in-part of copending U.S. Ser. No. 07/814,923 now U.S. Pat. No. 5,301,838, entitled "Multi-Layer Bottle With Separable Inner Layer And Method Of Forming Same," filed Jan. 8, 1992 by Schmidt et al., which itself is a continuation-in-part of U.S. Ser. No. 07/644,624, filed Jan. 23, 1991 by Schmidt et al. and Ser. No. 07/698,931 filed May 13, 1991 by Schmidt, the latter two of which are now abandoned.

This invention relates in general to new and useful improvements in dispensing containers, and more specifically to a squeezable multi-layer plastic container having an inner layer which collapses to dispense a product held within the container, and which further includes a one-way valve in an outer layer of the container to facilitate collapse of the inner layer.

BACKGROUND OF THE INVENTION

The above-mentioned priority applications, which are hereby incorporated by reference in their entirety, describe a multi-layer container for a dispensing system having an inner layer which is separate from an outer layer and which collapses when positive or negative pressure is applied in order to dispense a product from the container. The container is economical to manufacture, light in weight, easy to handle, can be made of recyclable materials, and is "product efficient" in that substantially all of the product can be dispensed from the container during use.

In the priority applications, two methods are described for applying a pressure differential across the inner layer to collapse the same. In a first method, a valve in a dispensing hose sealed to the top of the container applies negative pressure to the inside of the inner layer to withdraw product from the open mouth of the container. In a second method, an air line attached to a bottom aperture in the outer layer applies positive pressure to the outside of the inner layer to collapse the same and force the product out the open top end of the container.

It is an object of this invention to provide an alternative way of dispensing a product from a multi-layer container such that a squeezing action applied to the outer layer causes the inner layer to collapse and dispense the product out the open upper end of the container.

SUMMARY OF THE INVENTION

In accordance with this invention, a multi-layer dispensing container is provided having a collapsable inner layer which is separate from a resilient outer layer, and wherein the inner layer collapses when a positive pressure is applied to the outer layer, such as by squeezing. The squeezing force applied to the outer layer causes an increasing pressure in a chamber formed between the inner and outer layers, which increasing pressure causes the inner layer to collapse. A valve is provided in an external aperture in the outer layer. The valve remains closed when the outer layer is squeezed, to insure an increasing pressure in the chamber. When the resilient outer layer is released, it begins to return to its original shape and the resulting reduction in pressure within the chamber causes the valve to open. The open valve allows air to enter the chamber until it is at substantially the same pressure as the outside ambient air, and thus causes the outer layer to return to its original position and the inner layer to remain collapsed. A second valve is preferably provided at the open upper end of the container to prevent air from entering the interior of the container (inside the inner layer) when the outer layer is released.

The multi-layer container is preferably blow molded from a multi-layer polymeric preform having at least two layers, and wherein at least a portion of the inner layer is of a material having substantially no tendency to chemically bond with an adjacent portion of the outer layer. This preform may be injection molded from a first polymer, which forms the inner layer, and which is not substantially melt soluble in a second polymer forming the outer layer. Secondary hydrogen (i.e., non-chemical) bonding may exist between the inner and outer layers, which still allows easy separation of the inner and outer layers. Furthermore, each of the inner and outer layers may consist of more than one layer, e.g., they may each include boundary layers of an enhanced barrier or high thermal stability layer, and/or core or other layers of recycled or other materials with various physical properties.

The lower valve preferably includes a base portion of polymeric material (such as low density polyethylene) sealed within an external aperture which is preferably at the bottom of the outer layer, and with a plurality of holes extending through the base. A polymeric film (such as highly plasticized polyvinyl chloride) is secured at one end to the top of the base and forms a flap which alternately opens and closes the holes in the base. When open, the flap allows air to enter the between the inner and outer layers of the container, and when closed, the flap prevents air from exiting the chamber. The upper valve may be of similar construction.

In an alternative embodiment, the inner layer of the container may taper in thickness to provide a greater thickness towards the top end of the container and a lower thickness at the bottom. This helps initiate collapse at the thinnest bottom portion of the inner layer when pressure is applied, and ensures a gradually progressive collapse from the bottom to the top of the inner layer to insure that all of the product is dispensed.

These and other features of the invention will be more particularly described by the following detailed description and drawings of certain preferred embodiments.

DETAILED DESCRIPTION

Figure 1:
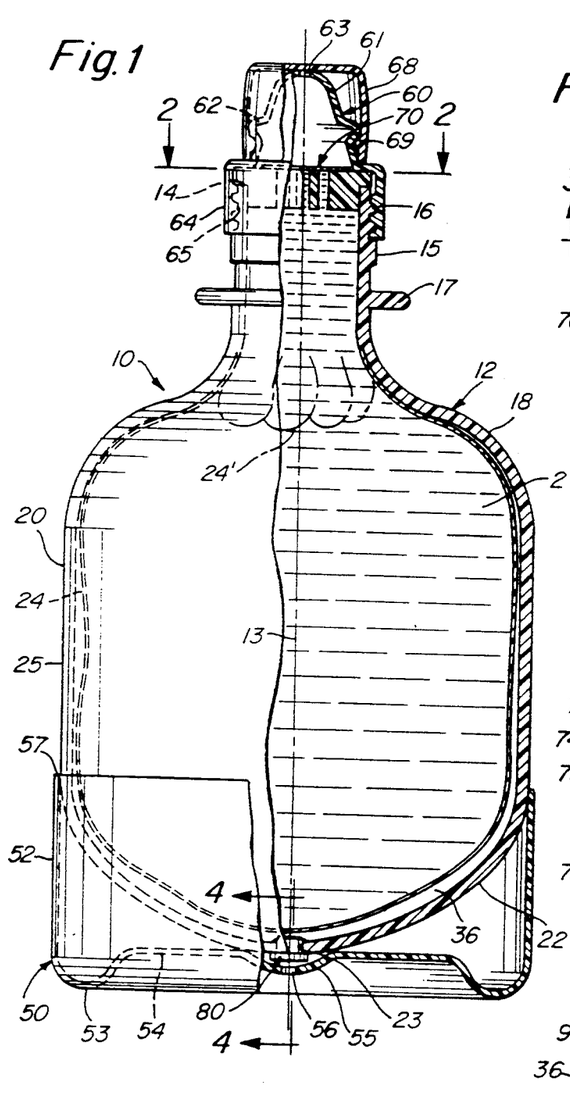
FIG. 1 is an elevational view, partially broken away, of a preferred embodiment of this invention for use as a ketchup dispenser, wherein an inner layer of the container is collapsed by applying positive pressure, such as by squeezing, to the outer layer of the container.

Referring now to the drawings, FIG. 1 illustrates a ketchup dispenser 10 which includes the preferred container 12 of this invention. For the sake of simplicity, the inner and outer layers of the container are shown in FIGS. 1-6, but the multi-layer construction of each of the inner and outer layers themselves is shown in detail only in FIG. 7. The dispenser 10 includes a base cup 50 in which a hemispherical bottom portion 22 of the container 12 is seated in a sealed upright position. A nozzle 60 is attached to the upper end of the container 12, and a removable cap 68 is positionable over the nozzle. An upper valve 70 is provided at the open upper end of the container 12, inside the nozzle, and a lower valve 80 is provided within an external aperture in the bottom of the container 12.

Figure 2:
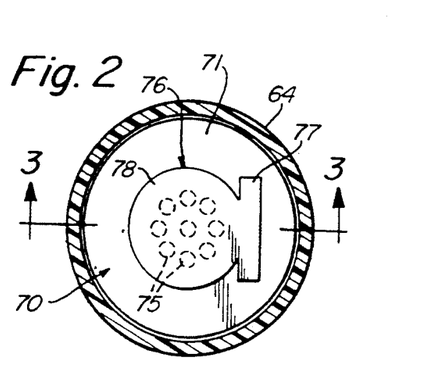
FIG. 2 is a sectional view taken along the section lines 2—2 of FIG. 1 showing more specifically the resealable flap on the top of the upper valve which prevents air from re-entering the inner layer when the outer layer is released.
Figure 3:
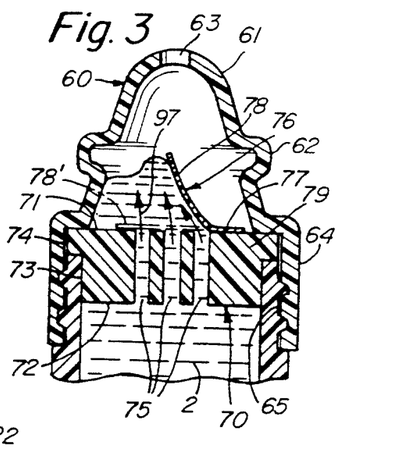
FIG. 3 is an enlarged fragmentary view taken along the section lines 3—3 of FIG. 2 showing how the upper valve opens to allow ketchup to exit via a nozzle at the upper end of the container.
Figure 4:
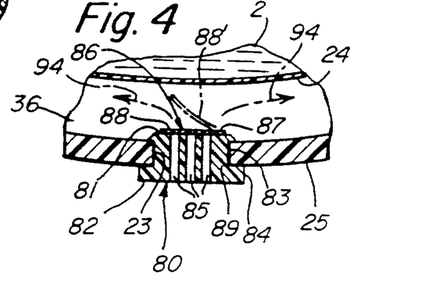
FIG. 4 is an enlarged fragmentary view taken along the section lines 4—4 of FIG. 1 showing more specifically the lower valve which allows air to enter the chamber between the inner and outer layers when the outer layer is released.
Figure 5:
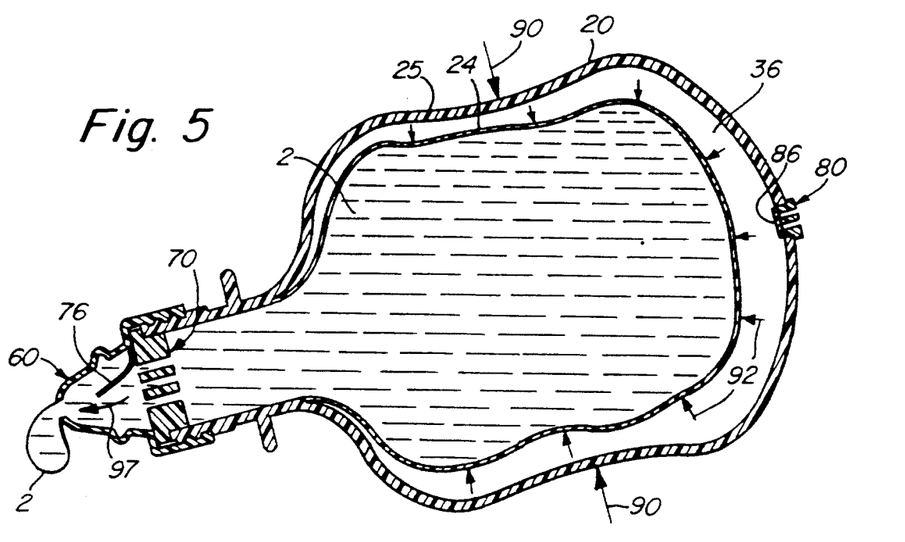
FIG. 5 is a schematic cross-sectional view of the container of FIG. 1 during use, whereby a squeezing action applied to the outer layer causes the inner layer to collapse and dispense ketchup out the upper nozzle of the container.
Figure 6:
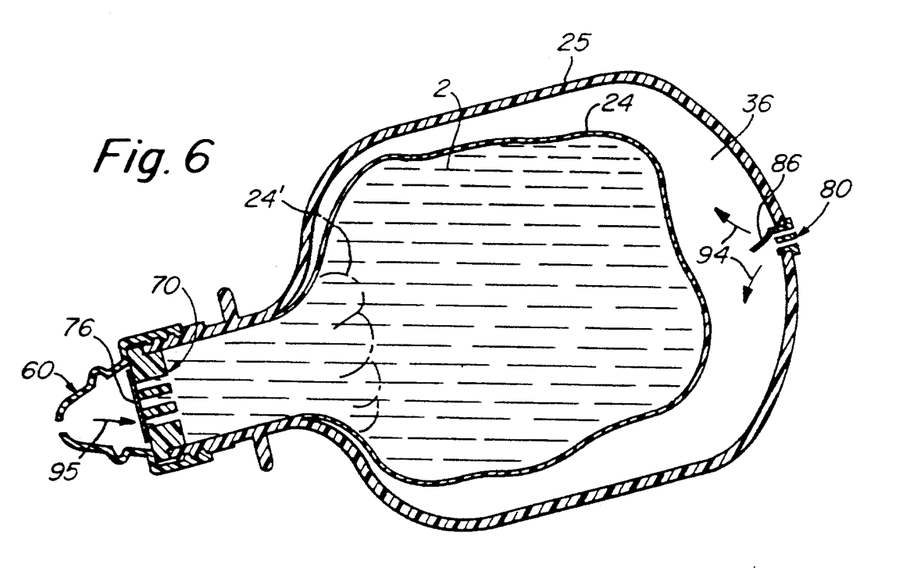
FIG. 6 is a schematic cross-sectional view of the container of FIG. 1 during use, whereby after release of the outer layer the lower valve opens to admit air into the chamber (between the inner and outer layers) and the upper valve closes to prevent air from entering the inner layer.

The upper and lower one-way valves 70, 80 are shown in greater detail in FIGS. 2-4. The overall operation of the container during use is illustrated in FIGS. 5-6. A cross-section of the container wall is provided in FIG. 7 to show the components of the inner and outer layers.

The multi-layer container 12 of this invention is preferably made of a polyester such as polyethylene terephthalate (PET), including homopolymers and copolymers of PET. In the preferred embodiment described herein, the container 12 has a main body which includes a shoulder portion 18, sidewall portion 20, and base portion 22. The container is substantially cylindrical, as defined by vertical centerline 13. The container has an open upper end 14 through which product is dispensed, and adjacent the upper end a neck finish 15 with outer threads 16 for engaging inner threads on a lower flange 64 of nozzle 60. The container is blow-molded from an injection molded preform 4 (see FIG. 7), as described more fully hereinafter and in priority application U.S. Ser. No. 07/814,923. A neck flange 17 (below the neck finish 15 and above the tapered shoulder portion 18) is provided for holding the preform during blow molding of the container. Below the tapered shoulder portion 18 is an enlarged diameter cylindrical sidewall portion 20, which undergoes the greatest expansion during blow molding. The sidewall 20 has the thinnest wall thickness and greatest resilience and is thus adapted to be squeezed for dispensing purposes. The reduced wall thickness of sidewall 20 is not shown in the schematic illustration of the drawings for simplicity. Finally, the hemispherical base portion 22 forms the closed bottom end of the container.

The container 12 includes an inner collapsible layer 24 which is separate from the more rigid outer layer 25. There is an aperture 23 in the outer layer 25 at the bottom of the container, in which lower valve 80 is positioned, while the inner layer 24 is continuous throughout the main body (shoulder, sidewall and bottom) of the container. At the upper neck finish, the inner and outer layers 24, 25 remain substantially bonded as this portion of the container is not expanded during blow molding. Thus, when the inner layer 24 collapses to dispense ketchup out the upper end of the container, the inner layer will progressively collapse up the sidewall and shoulder to about the position shown in phantom lines 24' adjacent the neck finish 15.

The operation of the container is best shown in FIGS. 5-6. To dispense ketchup, the container is held in one or both hands and tilted sideways while positive pressure is applied by the fingers to opposite sides of the sidewall 20, as illustrated by arrows 90. This pressure causes outer layer 25 to deform radially inwardly causing an increase in pressure in the chamber 36 between the outer layer 25 and inner layer 24. The lower valve 80 is closed thus insuring an increase in pressure in chamber 36. The increased pressure in chamber 36 acts as a positive pressure force illustrated by arrows 92 about the outer surface of inner layer 24, causing the inner layer 24 to collapse and push ketchup 2 out the holes in the upper valve 70. The force of ketchup 2 is sufficient to open the flap 76 on the top end of valve 70 and allow the ketchup to flow through the nozzle 60 (as shown by arrow 97) and out the aperture 63 in the upper end of nozzle 60. When sufficient ketchup has been dispensed, the user releases the pressure 90 on outer sidewall 20, and the resilient nature of outer layer 25 causes it to return to substantially its original cylindrical position. Meanwhile, the reduction in pressure in chamber 36 between the inner and outer layers causes the lower valve 80 to open and air (as illustrated by arrows 94) enters through the holes in valve 80 to ensure that inner layer 24 remains collapsed. The pressure differential between the atmospheric pressure outside the container and the reduced pressure in chamber 36 is sufficient to open flap 86 on lower valve 80 and permit air to enter the chamber 36. Meanwhile, the removal of force 90 from the outer layer, and thus the corresponding decrease in pressure 92 on the inner layer, means that ketchup 2 is no longer under sufficient pressure to open the flap 76 in the upper valve 70, and valve 70 closes preventing air (illustrated by arrow 95) from entering the top holes in valve 70. This ensures that air does not enter the inner layer from the top end of the container which may cause the inner layer to re-expand to its original volume. Instead, with each successive dispensing operation, inner layer 24 is successively reduced in volume until substantially all of the product is dispensed when the inner bag reaches the phantom position 24' adjacent the neck finish of the container.

The nozzle 60 at the upper end of the container is more specifically illustrated in FIG. 1. It includes an upper spout 61 having a radially extending cap ring 62 and a central upper aperture 63 through which the ketchup is dispensed. It further includes a lower flange 64 which is sealed around the upper end of the container at neck finish 15, with inner threads 65 engaging outer threads 16 on the neck flange. A cap 68 is provided over the spout 61 and includes a lower snap-fit rim 69 which sits below cap ring 62. Cap 68 is easily removed by applying a slight manual pressure to the side of the cap.

The base cup 50 is specifically illustrated in FIG. 1 as including a cylindrical sidewall 52, the upper end 57 of which engages the sidewall 20 of the container and is preferably glued thereto. At the bottom of the sidewall is a rounded contact rim 53 on which the container rests upright, and a recessed bottom wall 54 is provided radially inward from the contact rim 53. A central downwardly protruding dome 55 provides clearance for the lower valve 80 in the container 12, and a central aperture 56 in the base cup allows air to enter the lower valve 80.

The upper valve is more specifically illustrated in FIGS. 2-3 and includes a base 79 having a top surface 71, a bottom surface 72, and a cylindrical sidewall 73 sized to fit within the upper end of the container. An enlarged diameter upper rim 74 is held between the upper end 14 of the container and the nozzle 60. A plurality of through holes 75 are provided in the base 79 of the valve. A flap 76 sits on the top surface 71 of the base and includes an attached hinge portion 77 which is glued to the top surface 71 of the valve, and a cover portion 78 which sits over the holes 75 in the base. The normally closed cover flap 78 is readily separated from the base 79 by the force of ketchup 2 being pushed up through holes 75, as shown in FIG. 3. Once the dispensing pressure on the sidewall of the container is released, the atmospheric pressure causes air to enter nozzle aperture 63 and close the cover flap 78 over the base holes 75 as shown in phantom line 78', thus preventing air from entering the inner layer from the top of the container. The base 79 can be held in the upper end of the container by an interference fit, adhesive, or compressable retaining clips molded in the side of the base to hold it in place.

The lower valve 80 is substantially the same as the upper valve 70, although it can generally be made smaller. As shown in FIG. 4, lower valve 80 is positioned within aperture 23 in the bottom outer wall of the container. The valve 80 includes a base 89 with top surface 81, bottom surface 82, sidewall portion 83 positioned within aperture 23, and enlarged diameter lower rim portion 84 positioned below (outside) the outer layer 25. The top surface 81 is positioned adjacent the inner surface of outer layer 25, in the chamber 36 between the inner layer 24 and outer layer 25. Through holes 85 are provided in the base 89. A flap 86 has an attached hinge portion 87 which is glued to the top surface of the base, and a cover portion 88 which is positionable over the holes 85. When dispensing force is applied to the outer layer (FIG. 5), the increased pressure in chamber 36 insures that normally closed cover flap 88 remains sealed down over base 89 to cover holes 85, whereas release of the dispensing force (FIG. 6) causes a reduction in pressure in chamber 36 which allows atmospheric air to push open the cover flap to position 88' shown in phantom (FIG. 4) and allowing air (arrows 94) to enter into the chamber 36. This facilitates the return of resilient outer layer 25 to its original cylindrical position. Once the pressure in chamber 36 has substantially equilibrated with the atmospheric pressure outside the container, flap 86 returns to its normally closed position.

Figure 7:
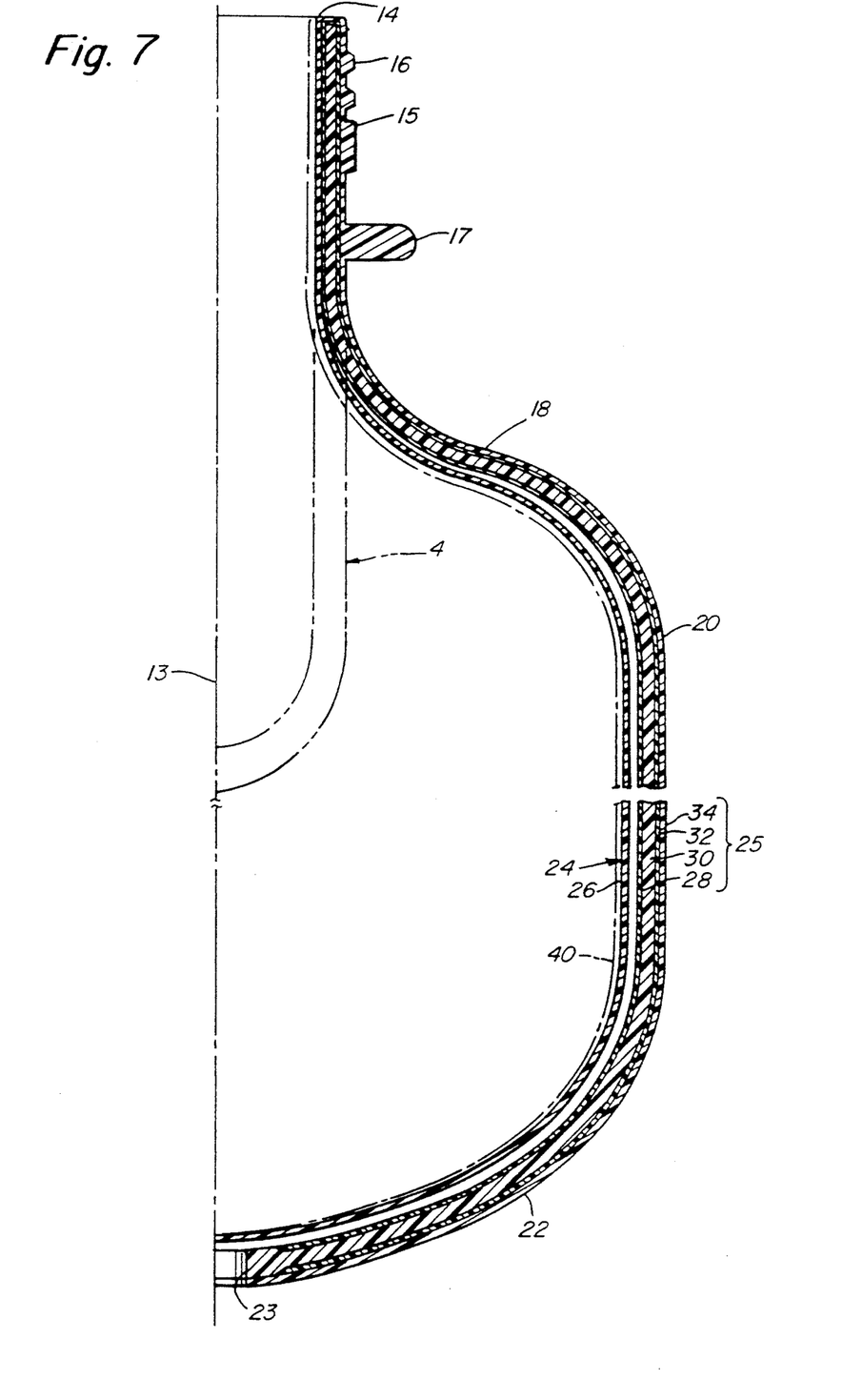
FIG. 7 is a vertical sectional view showing the various layers through the wall of the container, and showing in phantom lines a preform and an alternative tapered inner layer of the container.

As shown in FIG. 7, the multi-layer container may be formed from a variety of materials to facilitate separation of inner layer 24 from outer layer 25 and to provide certain barrier layers which protect ketchup 2 from gases or moisture passing through the container. Thus, upper end 14, neck finish 15, neck flange 17, shoulder portion 18, sidewall portion 20, and most of base portion 22 are formed of five layers in this preferred embodiment. The inner layer 24 consists of a single innermost layer 26 of PET. The outer layer 25 includes four layers, an inner boundary layer 28 of ethylene vinyl alcohol (EVOH), a core layer of PET 30, an outer boundary layer 32 of EVOH, and an outermost layer 34 of PET. The boundary layers 28 and 32 are substantially thinner than the innermost, outermost and core layers of PET, and due to the enhanced barrier properties of EVOH provide the required barrier properties in a greatly reduced thickness (as compared to the thickness which would be required of a PET layer). Foremost, however, the inner boundary layer 28 enables ready separation of innermost layer 26 from the remaining layers 28, 30, 32 and 34 which form the composite outer layer 25.

An alternative embodiment is illustrated in FIG. 7 by phantom line 40, wherein inner layer 24 has a tapered wall thickness. The inner layer increases in thickness going from the bottom to the top of the container, which initiates collapse of the inner layer at the bottom of the container and then a progressive gradual collapse up the sidewall of the container. In this embodiment there is a preferred relationship of a 4 to 1 increase in thickness from the bottom to the top. For example, a thickness in the base of 0.005" would require a gradual increase in thickness ending at the top with 0.020".

The preferred container of this invention is blow molded from a multi-layer preform 4 which is shown in phantom in FIG. 7. The preform 4 includes an elongated cylindrical body having a generally hemispherical closed bottom end and an open top end with the same thread finish and neck flange of the formed container. The preform has the same layers which form the corresponding layers of the blown container. The preform may be injection molded substantially as described in U.S. Pat. No. 4,609,516 entitled "Method Of Forming Laminated Preforms," which issued Sep. 2, 1986 on an application by Krishnakumar et al., and which is hereby incorporated by reference in its entirety. The innermost and outermost PET layers are first injected into a bottom gate region of the preform mold and flow up the sidewalls, followed by a second injection of EVOH which forms the inner and outer boundary layers, and a third injection of PET which forms the core layer of PET. During this process it may occur that in the area adjacent the preform gate, the core layer of PET is merged with the outermost layer of PET. When this occurs, as illustrated in FIG. 7, there is likewise formed in the bottom of the blown container an area adjacent aperture 23 where core layer 30 merges with outermost layer 34. However, this elimination of outer boundary layer 32 adjacent the gate is not generally a problem and in fact helps insure that only innermost layer 26 is separated and collapsed from the remaining outer layers. Still further, by providing only a single innermost collapsible layer, the collapsible layer can be made very thin which facilitates its collapse, and the thickness of the outer layers can be maximized to insure sufficient rigidity of the outer container which prevents its collapse during collapse of the inner layer.

In the preferred embodiment illustrated herein, the ketchup container 12 is an eight-ounce bottle having an average sidewall thickness in the following range:
outermost PET layer 34: 0.003-0.005"
outer EVOH boundary layer 32: 0.0002-0.0003"
core PET layer 30: 0.006-0.010"
inner EVOH boundary layer 28: 0.0002-0.0003"
innermost PET layer 26: 0.003-0.005".

As previously mentioned, the sidewall 20 is expanded to the greatest extent during blow molding and thus has the thinnest wall structure. It typically undergoes an average biaxial stretch ratio of 8–12x. In contrast, the base portion 22 undergoes a much lower amount of stretch, e.g., an average biaxial stretch ratio of 2–5x. Thus, the resultant container base is much thicker than the sidewall, and may have the following average wall thickness:

innermost PET layer 26: 0.025–0.045"
inner EVOH boundary layer 28: 0.0001–0.0003"
merged core and outermost PET layers 30 and 34: 0.005–0.025".

Thus, the total average wall thickness of the sidewall may range from 0.0124–0.0206". In contrast, the total average wall thickness of the base may range from 0.0301–0.0703". In this preferred embodiment, the PET would make up 97–98.5% of the total weight of the bottle, while the EVOH makes up the remaining 1.5–3%. The above wall thicknesses provide the necessary combination of sidewall rigidity and resilience to withstand repeated squeezing and handling without denting or rupture. The intrinsic viscosity of the PET is not critical, but may be in the range of about 0.70–0.84.

In the preferred embodiment described herein, the lower valve 80 (in the bottom of the ketchup container) has a base made of low density polyethylene which is about 0.25" in diameter and 0.15" in thickness, and the flap 86 is a thin, soft vinyl film, 0.004–0.008" in thickness and 0.20" in diameter, made of highly plasticized polyvinyl chloride. Nine circular through holes 85 are provided in a circular pattern, each hole being 0.02" in diameter.

The aperture 23 in the bottom of the outer layer may be formed in the preform during the injection molding process, by providing a gate pin in the injection nozzle which enters into the molten plastic material while the gate pin is moved into the nozzle closing position. The gate pin would terminate at the inner layer 26, so that the inner layer remains continuous. Alternatively, the aperture 23 may be formed in the outer layer after the injection molding process, such as by externally machining an opening through the outer layer with a flat end drill or mill.

There is substantially no primary (chemical) bonding between the expanded layers of this container, i.e., below the neck finish and between the innermost PET layer 26 and the inner boundary EVOH layer 28. At most, secondary (hydrogen bonding) exists between these layers. As a result, when pressure is applied between the layers it causes the innermost layer to collapse. In the preferred embodiment, the innermost layer 26 is predelaminated from the outer layer by injecting positive pressure air through the aperture 23 which causes the inner layer 26 to fully collapse, followed by re-expansion of the inner layer to a position adjacent the outer layer. This is accomplished before the product is introduced into the container to facilitate later collapse of the inner layer when filled with a product.

The container may be made from a variety of materials, limited only by the requirement that the inner layer be readily separable from the next inner layer. Thus, any thermoplastic resin may be used, such as polymers typically used in the packaging industry, i.e., polyethylene terephthalate (PET), polypropylene, polyethylene, polyvinyl chloride, polycarbonate and mixtures thereof. The boundary layers are preferably made of a material which is not substantially melt soluble in and thus has substantially no tendency to chemically bond or adhere to the material of the other layers. The boundary layers may be made of any secondary polymer resin such as ethylene vinyl alcohol (EVOH), polyethylene vinyl alcohol (PVOH), nylon (e.g., MXD-6 sold by Mitsubishi Corporation, New York, N.Y.), and mixtures thereof.

Alternatively, more than one layer may be collapsed as the separable inner layer. Thus, in the five-layer structure previously described, the inner boundary layer may collapse along with the innermost layer. As a further alternative, the core layer, inner boundary layer and innermost layer may collapse as a unit. Still further, the outer boundary layer, core layer, inner boundary layer, and innermost layer may collapse as a unit. All that is required is that the remaining outer layer or layers be sufficiently rigid, and the collapsible layers sufficiently pliable, to permit ready separation between the inner and outer layers and non-collapse of the outer layers.

As further alternatives, a different number of layers may be provided in the container sidewall, such as a three or seven-layer structure. The size and shape of the containers may be varied, and depending upon the base structure of the container, a base cup may not be required. Thus, a champagne-type base or looted base, such as provided with pressurized carbonated beverage bottles, may be utilized. Furthermore, the container may be adapted to hold other types of products, for example, other food products including mayonnaise, mustard, and concentrated carbonated beverage syrup, other viscous fluids, pharmaceutical products such as creams and toothpaste, and other fluids or semi-solids. The relative thicknesses of the inner and outer layers, shape and size of the container, and relative thicknesses of the valve, base holes and flap, may be suitably adjusted to accommodate the viscous nature of the product. The pressure to squeeze the outer wall may be applied by some other apparatus, such as a mechanical or fluid force, and the container need not be tilted sideways. Also, the one-way valve 80 may be positioned other than in the base of the container, such as in the sidewall.

Although several preferred embodiments of the invention have been specifically illustrated and described herein, it is to be understood that variations may be made in the preform construction, materials, the container construction and the method of forming the container without departing from the spirit and scope of the invention as defined by appended claims.

What is claimed is:

1. A squeezable container for dispensing a product comprising:

a dispensing container having a resilient outer body and a flexible collapsible inner bag with the inner bag holding a product to be dispensed, the container having an open end from which the product is dispensed and a closed end, the inner bag and outer body being inner and outer layers respectively of a unitary multilayer expanded plastic perform container, wherein the inner layer is continuous and separate from the outer layer at the closed end of the container and joined thereto at least at the open end, and an aperture is provided in the outer layer at the closed end to enable air to enter between the inner and outer layers to facilitate collapse of the inner layer and form a chamber between the inner and outer layers;

a valve positioned in the aperture having an open position wherein a flow of air into the chamber is allowed and a closed position wherein a flow of air out of the chamber is restricted; and wherein when squeezed, the outer layer deforms inwardly and the valve remains closed to increase the pressure in the chamber and cause the inner layer to collapse and dispense product out the open end of the container, and when released, the resilient outer layer returns to substantially its original shape causing a reduction in pressure within the chamber which opens the valve and allows air to flow into the chamber to maintain the inner layer in its collapsed state.

2. The squeezable container of claim 1, wherein the valve comprises a base portion positioned in the aperture with at least one hole through the base, and a resealable member on the base which is positionable to close the hole when the valve is closed and to open the hole when the valve is open.

3. The squeezable container of claim 1, wherein a second valve is positioned in the open dispensing end of the container to prevent air from entering the inner layer when the outer layer is released.

4. The squeezable container of claim 1, wherein at least one of the inner and outer layers is made of polyester.

5. The squeezable container of claim 4, wherein the polyester is substantially polyethylene terephthalate.

6. The squeezable container of claim 4, wherein at least one of the inner and outer layers includes a boundary layer.

7. The squeezable container of claim 6, wherein the boundary layer is made of a barrier material.

8. The squeezable container of claim 6, wherein the barrier material is ethylene vinyl alcohol (EVOH).

9. The Squeezable container of claim 1, wherein the inner layer is a single layer and the outer layer includes a plurality of layers.

10. A squeezable container for dispensing a product comprising:

an integral container body formed by expansion from a multilayer preform, the container body including a main body portion with a plurality of layers and an open dispensing end, the layers including a continuous and collapsible inner layer and a resilient outer layer, the inner layer being joined to the outer layer at least at the open end and separate and apart from the outer layer in at least a portion of the main body to form a chamber between the inner and outer layers as the inner layer collapses, and an external aperture in the main body extending through the outer layer, wherein the inner layer has a tapered wall thickness, decreasing in thickness towards a base end of the container opposite the open dispensing end;

a valve positioned in the aperture having an open position wherein a flow of air into the chamber is allowed and a closed position wherein a flow of air out of the chamber is restricted; and wherein when squeezed, the outer layer deforms inwardly and the valve remains closed to increase the pressure in the chamber and cause the inner layer to collapse and dispense product out the open end of the container, and when released, the resilient outer layer returns to substantially its original shape causing a reduction in pressure within the chamber which opens the valve and allows air to flow into the chamber to maintain the inner layer in its collapsed state.

11. The squeezable container in claim 10, wherein the external aperture is in a base end of the container, opposite the open dispensing end.

12. A squeezable container for dispensing a product comprising:

a dispensing container having a resilient outer body and a flexible collapsible inner bag with the inner bag holding a product to be dispensed, the container having an open end from which the product is dispensed and a closed end, the inner bag and outer body being inner and outer layers respectively of a unitary multilayer expanded plastic preform container, wherein the inner layer is continuous and separate from the outer layer at the closed end of the container and joined thereto at least at the open end, and an aperture is provided in the outer layer at the closed end to enable air to enter between the inner and outer layers to facilitate collapse of the inner layer and form a chamber between the inner and outer layers; and a valve positioned in the aperture for restricting a flow of air into and out of the chamber.

13. The squeezable container of claim 12, wherein the valve includes a base portion positioned in the aperture with at least one hole through the base portion, and a resealable member on the base portion which is positionable to open and close the at least one hole.

14. The squeezable container of claim 12, wherein a second valve is positioned in the open dispensing end of the container to restrict a flow of air into the inner layer of the container when the resilient outer layer is released.

15. The squeezable container of claim 12, wherein at least one of the inner and outer layers is made of polyester.

16. The squeezable container of claim 15, wherein the polyester is substantially polyethylene terephthalate.

17. The squeezable container of any one of claims 12 and 16, wherein
at least one of the inner and outer layers includes a boundary layer.

18. The squeezable container of claim 17, wherein the boundary layer is made of a barrier material.

19. The squeezable container of claim 18, wherein the barrier material is ethylene vinyl alcohol (EVOH).

20. The squeezable container of claim 12, wherein the inner layer is a single layer and the outer layer includes a plurality of layers.

21. A squeezable container for dispensing a product comprising:

a dispensing container having a resilient outer body and a flexible collapsable inner bag with the inner bag holding a product to be dispensed, the container having an open end from which the product is dispensed and a closed end, the inner bag and outer body being inner and outer layers respectively of a unitary multilayer expanded plastic preform container, wherein the inner layer is continuous and separate from the outer layer at the closed end of the container and joined thereto at least at the open end, and an aperture is provided in the outer layer at the closed end to enable air to enter between the inner and outer layers to facilitate collapse of the inner layer and form a chamber between the inner and outer layers;

a valve positioned in the aperture for restricting a flow of air into and out of the chamber; and the inner layer has a tapered wall thickness, decreasing in thickness towards a base end of the container opposite the open dispensing end.

22. The squeezable container of claim 21, wherein the external aperture is in a base end of the container, opposite the open dispensing end.

23. A dispensing container having a resilient outer body and a flexible collapsible inner bag with the inner bag holding a product to be dispensed, the container having an open end from which the product is dispensed and a closed end, wherein the inner layer is separate from the outer layer at the closed end of the container and joined thereto at least at the open end, and an aperture is provided in the outer layer at the closed end to enable air to enter between the inner and outer layers to facilitate collapse of the inner layer, and wherein the inner layer has a tapered wall thickness, decreasing in thickness towards a base end of the container opposite the open dispensing end.

24. The container of claim 23, further including a valve positioned in the aperture for restricting a flow of air into and out of the aperture.

25. The container of claim 24, wherein the external aperture is in a base end of the container, opposite the open dispensing end.

26. The container of claim 24, wherein a chamber is formed between the inner and outer layers as the inner layer collapses, and the valve has an open position wherein a flow of air into the chamber is allowed and a closed position wherein a flow of air out of the chamber is restricted, and wherein when squeezed, the outer layer deforms inwardly and the valve remains closed to increase the pressure in the chamber and cause the inner layer to collapse and dispense product out the open end of the container, and when released, the resilient outer layer returns to substantially its original shape causing a reduction in pressure within the chamber which opens the valve and allows air to flow into the chamber to maintain the inner layer in its collapsed state.

27. The container of claim 26, wherein a second valve is positioned in the open dispensing end of the container to restrict a flow of air into the inner layer of the container when the resilient outer layer is released.

28. The squeezable container of claim 12, wherein:
the external aperture is in a base end of the container, opposite the open dispensing end.

* * * * *

UNITED STATES PATENT AND TRADEMARK OFFICE
CERTIFICATE OF CORRECTION

PATENT NO. : 5,332,121

DATED : July 26, 1994

INVENTOR(S) : Schmidt, et al

It is certified that error appears in the above-indentified patent and that said Letters Patent is hereby corrected as shown below:

Column 8, line 26, delete "looted" and substitute --footed--.

Signed and Sealed this

Twenty-seventh Day of September, 1994

BRUCE LEHMAN

Attest:

Attesting Officer

Commissioner of Patents and Trademarks